United States Patent [19]
Bruggink, Sr.

[11] 3,791,046
[45] Feb. 12, 1974

[54] DRYING APPARATUS FOR BARN MILK LINES

[76] Inventor: Gordon J. Bruggink, Sr., P.O. Box 248, Oostburg, Wis. 53070

[22] Filed: Mar. 1, 1973

[21] Appl. No.: 337,083

[52] U.S. Cl.................... 34/104, 34/230, 34/243 R
[51] Int. Cl............................................. F26b 25/00
[58] Field of Search . 34/104, 230, 234, 239, 243 R, 34/233; 137/143, 355.12; 134/58, 94; 432/231; 219/369–374

[56] References Cited
UNITED STATES PATENTS

| | | | |
|---|---|---|---|
| 3,067,756 | 12/1962 | Bruggink, Sr. | 34/104 |
| 3,603,002 | 9/1971 | Spierer | 34/243 R |
| 2,375,920 | 5/1945 | Hewitt | 34/243 R |

Primary Examiner—Kenneth W. Sprague
Assistant Examiner—James C. Yeung
Attorney, Agent, or Firm—Joseph G. Werner; Theodore J. Long; John M. Winter

[57] ABSTRACT

A drying apparatus for a barn milk pipe line system having a casing divided into a motor compartment and a fan compartment by a partition which supports a motor driven blower unit within the casing. The blower unit has a motor housing positioned within the motor compartment and a fan housing positioned on the opposite side of the partition within the fan compartment. A fan within the fan housing draws drying air into the fan housing and forces it outwardly through the fan compartment and casing outlet pipe to the pipe line without contact between the drying air and the motor.

6 Claims, 3 Drawing Figures

Patented Feb. 12, 1974

3,791,046

DRYING APPARATUS FOR BARN MILK LINES

BACKGROUND OF THE INVENTION

1. Field of the Invention

This invention pertains generally to the field of pipe line milking systems, and more particularly to apparatus for drying out milk pipe lines after washing operations.

2. Description of the Prior Art

In milk pipe line systems, and particularly systems of the so-called "around the barn milking," it is customary to provide means for washing out the pipe line after the milking operation to maintain the line in a sanitary condition, without the necessity of taking the pipe down and washing individual links and fittings. In a number of the systems, glass pipe and fittings are utilized. After the washing operation, the inner surfaces of the pipe and fittings are wet and a residue of the washing solution remains in the system.

In my earlier U. S. Pat. No. 3,067,756, I disclosed a drying attachment for barn milk lines which provided a means for drying and blowing out barn milk pipe lines to eliminate water and washing solution from the lines. My previously disclosed drying attachment includes an electric motor and fan located within a cylindrical housing. Drying air is drawn through the housing and forced through a conical discharge end into the milk pipe line by a motor and fan located within the housing. The drying air is in direct contact with the motor as it passes through the housing.

Since previous invention, the use of drying attachments for barn milk lines has become widespread, and in some states drying attachments have been made mandatory for certain types of milk pipe lines. Extensive use of such drying attachments has shown that it is desireable to provide additional filter means downstream from the motor. Such filters remove carbon particles which are picked up from the drying air by the brushes of the motor. However, filters placed downstream from the motor having sufficient density to remove the carbon particles from the air have adversely affected the performance and efficiency of such drying attachments. This has necessitated larger units or longer running periods, and in some cases has resulted in failure to completely dry the pipe lines. In addition, despite the use of such filters, some carbon particles have continued to pass through the filters into the pipe lines.

SUMMARY OF THE INVENTION

I have invented a new and improved drying apparatus for barn milk lines wherein the drying air does not pass over the motor to pick up carbon particles from the brushes, and which requires no filtration downstream from the blower. My improved drying apparatus includes a casing which is divided into two separate compartments by a partition which supports the blower unit within the casing. The motor housing and motor of the blower unit is located in the motor compartment on one side of the partition, and the blower fan housing and fan are located in the fan compartment on the opposite side of the partition.

The fan draws drying air through a filter into the drying compartment and fan housing, and forces it out of the casing through a restricted outlet pipe, without any contact between the drying air and the motor. Accordingly, the drying air has no opportunity to pick up carbon from the motor brushes, and no filtration of the air downstream from the fan is required. Turbulence of the air within the fan housing and casing, and compression of the air as it is forced through the restricted outlet pipe, raises the temperature of the air a sufficient amount to provide the required drying capability.

It is an object of f the present invention to provide an improved drying apparatus for removing moisture and washing solution from milk pipe lines.

It is a further object to the present invention to provide an improved drying apparatus for milk pipe lines which does not introduce any foreign materials into the drying air, and requires no filter downstream from the blower fan.

Other objects, features and advantages of my invention will be apparent from the following detailed description taken in conjunction with the accompanying drawings wherein a preferred embodiment of the invention has been selected for exemplification.

DESCRIPTION OF THE PREFERRED EMBODIMENT

Figure 1:
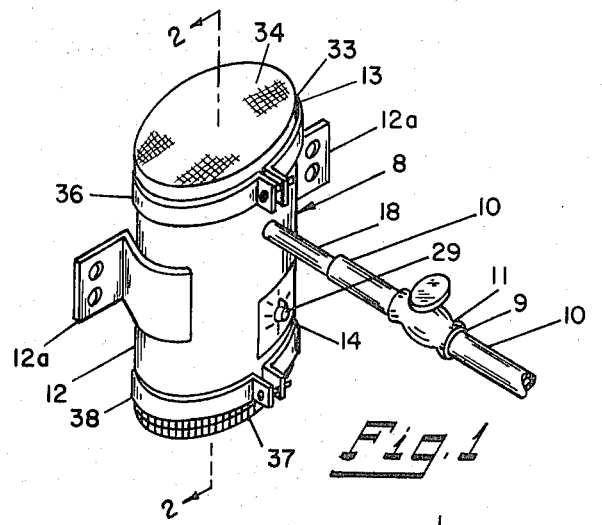
FIG. 1 is a perspective view of a drying apparatus exemplifing my invention, showing the drying apparatus connected to a barn pipe line milking system.

Referring more particularly to the drawings, wherein like numerals refer to like parts throughout the several views, FIG. 1 illustrates my drying apparatus, shown generally at 8, connected to a milk pipe line system 9. The pipe line system 9 may be of the general type shown in FIG. 1 of my U.S. Pat. No. 3,067,756, and includes a milk pipe line 10 and a shut-off valve 11.

Figure 2:
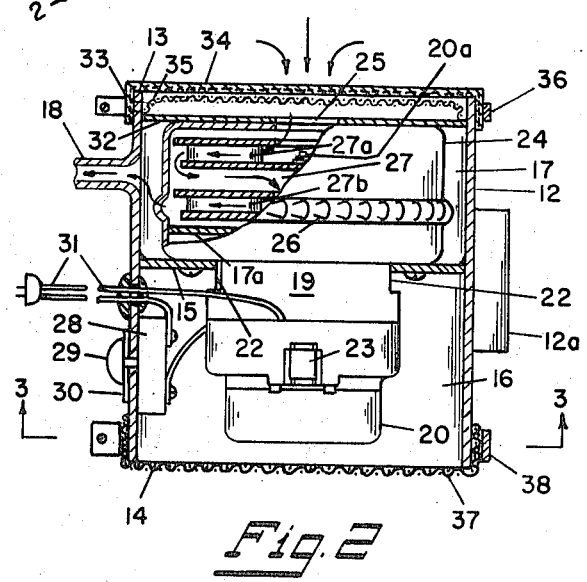
FIG. 2 is a section view taken along line 2—2 in FIG. 1.

My drying apparatus 8 has an open-ended casing 12 which is secured in the desired operating position by means of one or more support brackets 12A which are secured to the outer circumference of the casing 12. As best shown in FIG. 2, the casing has an inlet end 13 and a ventilating end 14. A support partition 15 extends transversely across the interior of the cylindrical casing 12 to divide the interior into a motor compartment 16 and a fan compartment 17. An outlet pipe 18 is mounted in the cylinder wall of the casing 12 in communication with the fan compartment 17 to provide outlet means for said casing.

Figure 3:
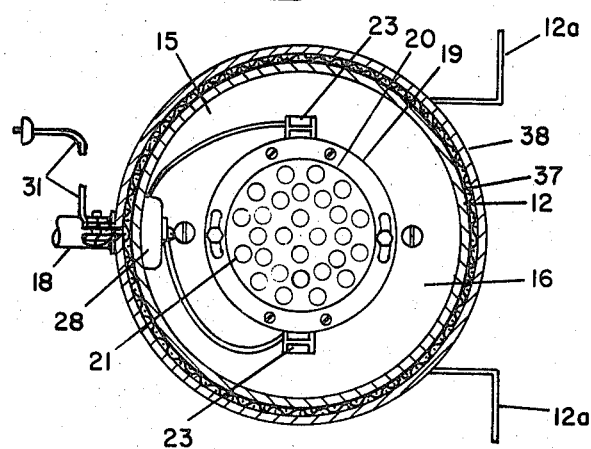
FIG. 3 is a section view taken along line 3—3 in FIG. 2.

A blower unit 19 is supported within the casing 12 on support partition 15, as shown in FIG. 2. The blower unit 19 is of a conventional motor-driven by-pass type, which includes a motor 20, and a fan means assembly 27 enclosed within a fan housing 24. The motor 20 extends through the support partition 15 to be substantially positioned within the motor compartment 16 of the casing 12. The fan housing 24 is bolted to the support partition 15, as shown in FIGS. 2 and 3, to substantially prevent any passage of air outside the blower unit 24 between the motor compartment 16 and the fan compartment 17.

The outer end of the motor 20 has a plurality of ventilation intake openings 21 through which ventilating air is drawn into the motor by an interior motor fan (not shown). The motor ventilating air is exhausted from the motor housing through ventilation exhaust openings 22 located in the housing of the motor 20 next to the fan housing 24. Accordingly, motor ventilation air is drawn toward the motor 20 through the open ventilating end 14 of the casing 12. The ventilating air passes into the motor through ventilating openings 21 to cool the motor and be exhausted through exhaust openings 22 back into the motor compartment 16 of the casing 12, and thence back out of the casing through the open ventilating end 14. A protective screen 37 is preferably maintained across the open casing ventilating end 14 by an adjustable retaining band 38 to prevent foreign objects from entering the motor compartment 16.

Power is supplied to the motor 20 through electrical leads 31. An electrical timer switch 28 is mounted within the motor compartment 16 of the casing 12 and is connected to the electrical circuit provided by electrical leads 31 and the motor 20 to control the operation of the motor. A timer dial 30 is disposed on the exterior surface of the casing 12, and a control handle assembly 29 extends from the timer switch 28 through the wall of the casing 12 in register with the dial 30.

The fan assembly 27 within the fan housing 24 preferably includes a primary fan 27a and a secondary fan 27b, which are substantially identical in structure. The fans are supported in spaced relation on motor shaft 20a which extends into the fan housing 24 through divider wall 17a. The divider wall 17a separates the interior of the fan housing 24 from the interior of the motor 20 to substantially prevent the passage of air therebetween.

An air seal partition 32 provides means for sealing the fan compartment 17 from the outside air being drawn into the dryer apparatus. The illustrated air seal partition 32 engages the interior wall of the casing 12 and the outer face of the fan housing 24 in air tight relation to provide the required air seal between the fan compartment 17 and the casing inlet end 13 and fan housing air intake 25.

As the fan assembly 27 is rotated by the motor 20, ambient air is drawn into the fan housing 24 through the axial air intake 25, as shown by the directional arrows. The primary fan 27a receives the incoming air centrally and forces it outwardly to the periphery of the fan housing 24. From there it is drawn back between the primary and secondary fans, 27a and 27b, toward the motor shaft 20a by the secondary fan. The secondary fan 27b receives the air centrally and forces it outwardly through the peripheral air exhaust ports 26, which are arranged around the periphery of the fan housing in alignment with the secondary fan 27b to provide exhaust means for the fan housing 24. The air forced out of the fan housing 24 into the fan compartment 17 then continues its movement around and through the fan compartment to the outlet pipe 18, through which it is exhausted from the casing 12 into the milk pipe line 10.

The action of the fan assembly 27 on the ambient air as it is forced through the fans in the fan compartment 17 and out the casing through outlet pipe 18 causes the temperature of the air to increase markedly due to turbulence and compression. As a result, the air which is forced through the casing outlet pipe 18 into the milk pipe line 10 has an elevated temperature and much greater drying capabilities than the ambient air initially drawn into the fan.

A filter assembly 33 is mounted on the inlet end 13 of the casing 12 to provide means for filtering ambient air before it is drawn into the axial air intake 25 of the fan housing 24. The filter assembly 33 preferably includes a rigid metal screen 35 in engagement with the air seal partition 32, and a fiber filter element 34 or other suitable type of filter which extends across the inlet end 13 of the casing. A filter retaining band 36 clamps the filter element 34 to the outer periphery of the casing 12 to retain the filter element 34 and screen 35 in place. The filter element 34 is the only filter that is employed in my drying apparatus 8. It separates entrained dust and other particles from the air prior to entry of the air into the fan housing. No filter is required downstream from the fan as no impurities are introduced into the drying air after the drying air passes throught the filter element 34. The metal screen 35 prevents the filter element from being drawn into the fan housing in the event the filter element is damaged in use. It also prevents large foreign objects from accidentally being thrust into the fan housing 24.

In operation, when the washing operation with respect to the milk pipe line system 9 is completed, the shutoff valve 11 is opened and the control handle assembly 29 of the timer switch 28 is turned to the position on the timer dial 30 which indicates the number of minutes which the operator desires the drying attachment to run to insure complete drying of the pipe line 10. Movement of the control handle assembly 29 activates the motor 20 through the timer switch 28 to initiate operation of my drying apparatus. As previously described, ambient air is drawn into the casing 12 through a filter element 34 at the inlet end 13, and heated air is forced out of the casing through outlet pipe 18 into pipe line system 9 in a continuous manner. When the amount of time selected on the timer dial 30 has elasped, the timer switch 28 opens to shut off the motor 20 and discontinue the drying operation. The pipe line shut off valve 11 should then be closed to prevent milk or washing solution from entering the dryer apparatus during subsequent operation of the milk pipe line system 9. Alternatively, the outlet pipe 18 of the drying apparatus 8 may be disconnected from the milk pipe line system 9 until the next drying operation.

It is understood that my invention is not confined to the particular construction and arrangement of parts herein illustrated and described, but embraces all such modified forms thereof as come within the scope of the following claims.

I claim:

1. In a milking system for barns including a milk pipe line, drying apparatus for blowing out and drying the pipe line after washing operations comprising:
   a. a casing having an inlet end, a ventilating end, and outlet means,
   b. partition means dividing the interior of said casing into a motor compartment in communication with said ventilating end, and a fan compartment in communication with said outlet means,
   c. a blower unit supported within said casing having a motor positioned within said motor compartment and a fan housing positioned within said fan compartment, said fan housing having an air intake communicating with said casing inlet end and exhaust means communicating with said casing fan compartment, d. fan means within said fan housing for drawing drying air into said fan housing intake and forcing it outwardly through said fan housing exhaust means, fan compartment and casing outlet means to said milk pipe line, e. air seal means between said fan housing and said casing for preventing said drying air from escaping from said fan compartment except through said casing outlet means, f. said partition means engaging said fan housing to prevent contact between said drying air and said motor.

2. The apparatus specified in claim 1 including means for filtering the drying air as it is being drawn into the fan housing intake by the fan means.

3. The drying apparatus specified in claim 2 wherein the means for filtering the air includes a fiber filter element, and a rigid screen positioned between the fiber filter element and the fan housing air intake.

4. The apparatus specified in claim 1 including timer means for controlling the operation of said motor.

5. In a milking system for barns including a milk pipe line, drying apparatus for blowing out and drying the pipe line after washing operations comprising, a. a casing having an inlet end and a ventilating end, b. outlet means extending from said casing near said inlet end, c. a blower unit mounted within said casing, said blower unit having a motor and a fan housing, said fan housing having an air intake communicating with said casing inlet end and exhaust means communicating with said casing outlet means, d. air seal means for preventing air flow from said fan housing between said fan housing air intake and said exhaust means, and e. partition means within said casing engaging said fan housing to prevent air flow between said motor and said casing outlet means.

6. The apparatus specified in claim 5 wherein the partition means for preventing air flow between the motor and the casing outlet means comprises a supporting partition which extends transversely between said casing and the blower unit in substantially air-tight relation to support said blower unit within said casing, and to separate the interior of said casing into a motor compartment in which the motor is located and a fan compartment in which the fan housing is located.

* * * * *